(12) United States Patent
Lai

(10) Patent No.: US 6,572,198 B1
(45) Date of Patent: Jun. 3, 2003

(54) STRUCTURE FOR CONNECTING A RIM WITH A TIRE

(75) Inventor: Tracy Lai, Taichung (TW)

(73) Assignee: Thunder Tiger Corporation, Taichung (TW)

( * ) Notice: Subject to any disclaimer, the term of this patent is extended or adjusted under 35 U.S.C. 154(b) by 0 days.

(21) Appl. No.: 10/117,137

(22) Filed: Apr. 8, 2002

(51) Int. Cl.$^7$ ................................................. B60B 3/10
(52) U.S. Cl. ........................... 301/64.303; 301/5.301
(58) Field of Search .................... 301/63.301, 63.302, 301/63.303, 5.301, 5.7, 5.304, 5.305, 5.306, 5.307, 5.309, 95.101, 95.104, 95.105, 95.1, 99, 100, 101; 152/396, 397, 398, 323

(56) References Cited

U.S. PATENT DOCUMENTS

| | | | | |
|---|---|---|---|---|
| 3,907,369 A | * | 9/1975 | Chevaux | 301/5.301 |
| 4,034,995 A | * | 7/1977 | Forward et al. | 280/843 |
| 4,090,283 A | * | 5/1978 | Woolley | 29/894 |
| 4,153,303 A | * | 5/1979 | Tanner | 301/64.706 |
| 4,218,098 A | * | 8/1980 | Burton | 301/5.7 |
| 4,358,162 A | * | 11/1982 | Schneider et al. | 301/64.706 |
| 5,810,450 A | * | 9/1998 | Tsu et al. | 301/5.301 |
| 6,106,074 A | * | 8/2000 | Chang | 301/5.301 |
| 6,131,923 A | * | 10/2000 | Miotto | 280/11.223 |
| 6,176,554 B1 | * | 1/2001 | Huang | 301/5.7 |

* cited by examiner

*Primary Examiner*—S. Joseph Morano
*Assistant Examiner*—Long Bao Nguyen

(57) ABSTRACT

A structure for connecting a rim with a tire. The tire is formed with a central axial through hole. Multiple annularly arranged perforations are formed around the through hole. Each perforation is defined by a close circumference which is separated from the through hole by a separating section, whereby the circumference of the perforation is enclosed and the perforation simply axially passes through the tire. The rim is composed of a seat and a cooperative disc. The seat has insertion members respectively corresponding to the perforations of the tire. The insertion members are inserted into the perforations from one side of the tire, while the disc is mounted on the other side of the tire to connect with the seat.

7 Claims, 7 Drawing Sheets

STRUCTURE FOR CONNECTING A RIM WITH A TIRE

BACKGROUND OF THE INVENTION

The present invention is related to a structure for connecting a rim with a tire, and more particularly to a connecting structure for easily and firmly mounting the rim in a rubber tire to avoid slippage.

When manufacturing plastic tire of a baggage case or a remote controllable model car, a molded rim is placed in a tire mold and then the tire is made by injection molding. The plastic material is filled up into the space between the circumference of the rim and the mold. After cooled and solidified, the plastic tire is tightly associated with the rim.

In fact, rubber is elastic and anti-abrasion so that rubber material is more suitable to serve as the material of the tire than plastic material. However, rubber is a thermosetting material and needs to be heated and sulfurated during molding. Therefore, it is impossible to embed a molded plastic rim in the mold for a rubber tire for molding the tire around the rim. Accordingly, it is necessary to separately mold the rubber tire and the rim and then connect them together.

FIG. 6 shows a conventional rubber tire 7 and rim 8. The middle portion of the rim 8 is formed with an annular groove 81 for accommodating therein the inner circumference 72 of the tire. Two ends of the rim 8 are formed with opposite flanges 82 having an outer diameter larger than inner diameter of the tire 7. The rim 8 is fitted into the central through hole 71 of the tire 7 with the inner circumference 72 of the tire snugly inlaid in the annular groove 81 of the rim 8. The two flanges 82 abut against two sides of the tire 7 to associate the rim 8 and the tire 7 together.

The above structure has some shortcomings as follows:
1. The rim 8 is forcedly fitted into the central through hole 71 of the tire 7 from one side thereof. Therefore, when the tire suffers a great lateral force, the tire may be detached from the rim, especially in the case that the tire 7 is hollow. The hollow tire 7 is easier to deform to result in detachment of the rim from the tire.
2. Referring to FIG. 7, the inner circumference 72 of the tire is simply inlaid in the annular groove 81 of the rim 8. The bottom face 811 of the annular groove and the inner circumference 72 of the tire are both polished faces so that slippage is very likely to take place between the tire 7 and the rim 8.
3. In order to avoid detachment or slippage, it is necessary to minimize the central through hole 71 of the tire 7 for tightly embracing the rim 8. However, the rubber material has a certain hardness and the outer diameter of the flanges 82 of the rim 8 is larger than the inner diameter of the through hole 71 of the tire 7. Therefore, it will be more difficult to plug the rim 8 into the through hole of the tire 7.

FIG. 8 shows another type of conventional rubber tire and rim. Such tire is different from the tire of FIG. 6 in that the rim 92 is composed of two separable symmetrical halves 921 each having a flange 922. One side of a half 921 distal from the flange is formed with multiple posts 923, while one side of the other half 921 is formed with multiple sockets 924 corresponding to the posts 923.

When assembled, the socket 924 of the half 921 are fitted into the through hole 911 from one side of the tire and then the posts 923 of the other half 921 are inserted into the sockets 924 from the other side of the tire so as to mount the rim 92 in the tire 91.

Such structure overcomes the difficulty in mounting the rim into the tire. However, the contacting faces of the rim and the tire are still polished faces so that the problem of slippage still exists.

The rim and the tire can be formed with cooperative dented faces and projecting faces to avoid slippage. However, the tire is simply formed with a central through hole 911. When the tire 91 suffers a radial pressure, the through hole 911 is easy to deform to cause detachment of the rim 92 out of the tire. Moreover, the entire rim is directly fitted through the through hole 911 so that once the through hole 911 is deformed, the rim is very easy to detach therefrom.

SUMMARY OF THE INVENTION

It is therefore a primary object of the present invention to provide a structure for firmly connecting a rim with a tire to avoid slippage between the rim and the tire. The tire is formed with multiple axial perforations. The rim is composed of a seat and a cooperative disc. The seat has insertion members for respectively fitting through the perforations of the tire to connect with the disc. The tire, the seat and the disc of the rim are effectively drivingly connected with each other without slippage.

It is a further object of the present invention to provide the above structure for firmly connecting a rim with a tire to avoid detachment of the rim from the tire. Two sides of the tire are respectively formed with two recesses. Accordingly, the center of the tire is formed with a thinner annular section having a central through hole. The perforations are formed on the annular section around the through hole. The circumferences of the perforations are enclosed and the perforations simply axially pass through the annular section. Therefore, the perforations and the through hole of the annular section are uneasy to deform. Even if the perforations or through hole is deformed, the insertion members inserted in the perforations prevent the rim from detaching out of the tire.

It is still a further object of the present invention to provide the above structure for firmly connecting a rim with a tire in which one side of the disc facing the seat is formed with multiple dented step faces respectively corresponding to free ends of the insertion members. The insertion member has a length slightly larger than the axial length of the perforation. When the insertion members are inserted through the perforations, the free ends of the insertion members just sink into and abut against the dented step faces. By means of cooperation between the step faces and the free ends of the insertion members, the seat is more firmly associated with the disc. Accordingly, when the seat is rotated, the disc is more effectively driven to rotate and the entire rim is better connected with the tire.

It is still a further object of the present invention to provide the above structure for conveniently connecting a rim with a tire. A post projects from each step face of the disc corresponding to the insertion member of the seat. When the disc is connected with the seat, the projecting posts are first inserted into the insertion members to guide the disc to move. Therefore, the free ends of the insertion members can truly respectively abut against the step faces to facilitate the assembly.

The present invention can be best understood through the following description and accompanying drawings wherein:

DETAILED DESCRIPTION OF THE PREFERRED EMBODIMENTS

Figure 1:
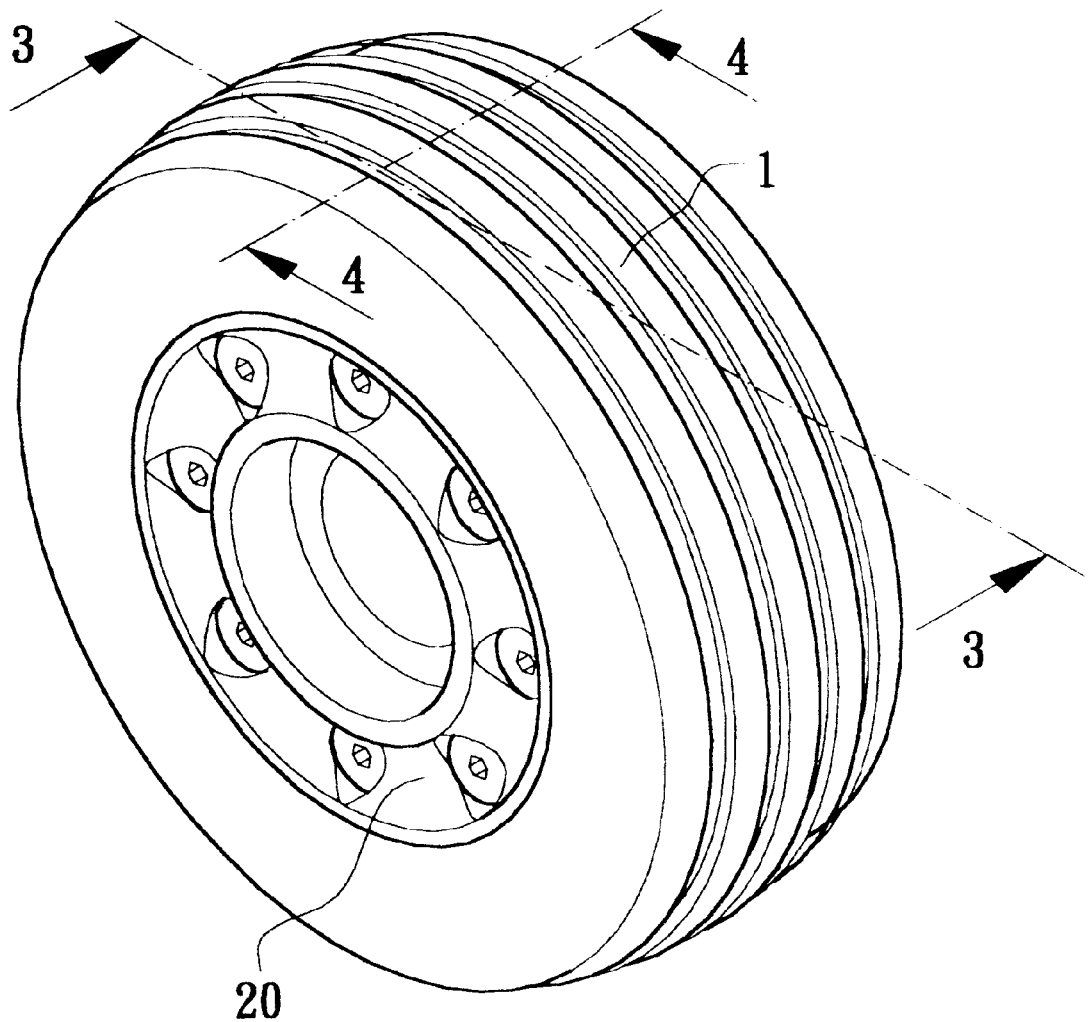
FIG. 1 is a perspective assembled view of the present invention.
Figure 2:
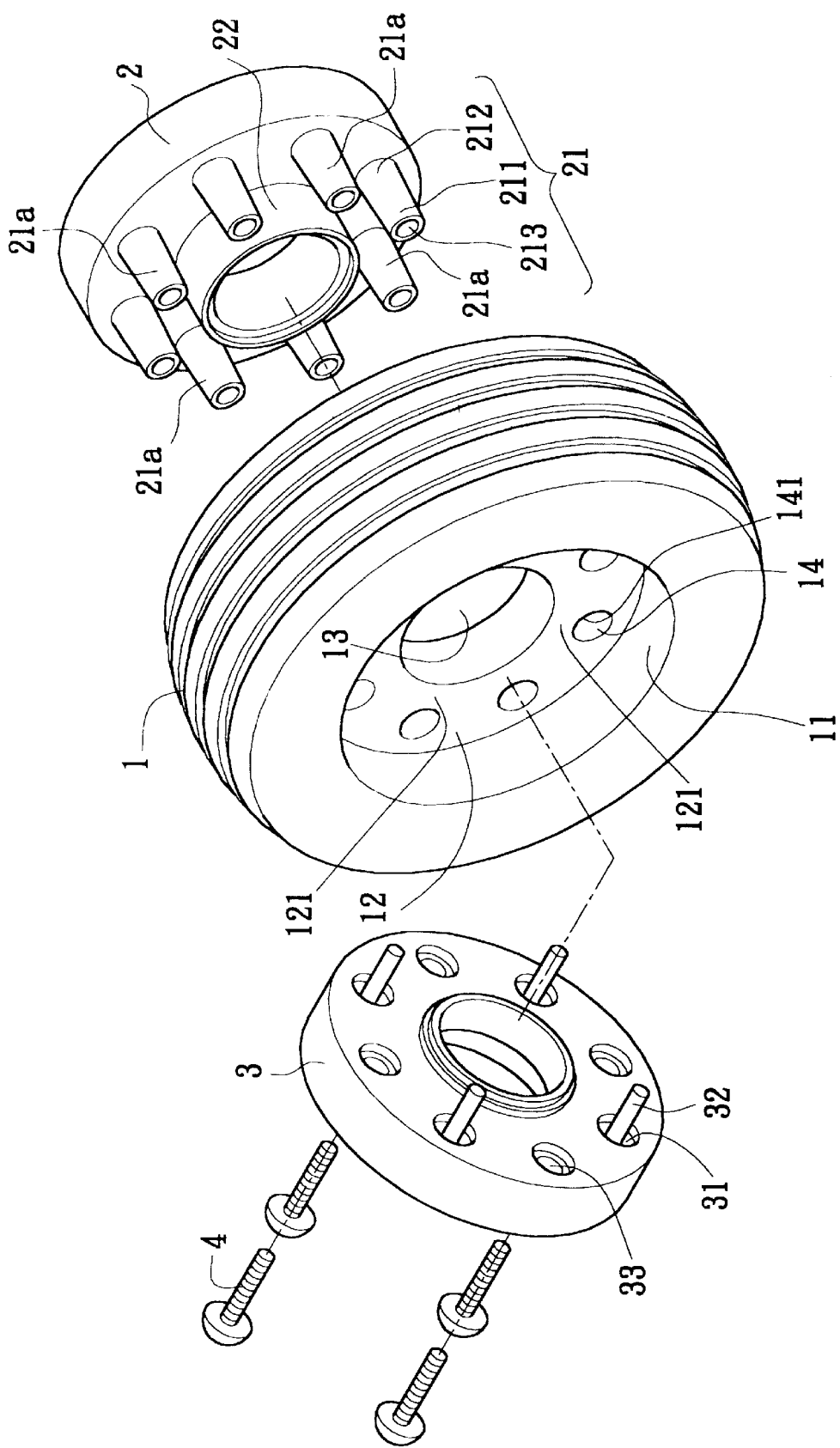
FIG. 2 is a perspective exploded view of the present invention.

Please refer to FIGS. 1 to 4 which show the structure for connecting a tire with a rim of the present invention. The tire 1 is hollow. Two sides of the tire 1 are respectively formed with two recesses 11 corresponding to the rim 20. Accordingly, the center of the tire 1 is formed with an annular section 12 thinner than the tire 1. The annular section 12 is formed with a central axial through hole 13. Multiple annularly arranged perforations 14 are formed around the through hole 13. Each perforation 14 is defined by a close circumference 141. The circumference 141 is separated from the through hole 13 by a separating section 121 therebetween, whereby the circumference of the perforation 14 is enclosed and the perforation 14 simply axially passes through the annular section 12.

The rim 20 is composed of a seat 2 and a cooperative disc 3. The center of the seat 2 is formed with a projecting annular wall 22 corresponding to the through hole 13 of the tire 13 for fitting therein. In addition, the seat 2 has insertion members 21 respectively corresponding to the perforations 14. In this embodiment, the insertion member 21 is a hollow tubular member having an axial hole 213. The axial length of the insertion member 21 is slightly larger than the axial length of the perforation 14. Therefore, when the seat 2 is inlaid in the recess 11 of the tire 1 with the insertion members 21 inserted in the perforations 14 from one side of the tire, the insertion members 21 of the seat 2 will slightly protrude out of the through hole 14.

The disc 3 is formed with an annular rib 34 for correspondingly fitting into the annular wall 22 of the seat 2 to make the seat 2 and the disc 3 more stably assembled with each other. In addition, the disc 3 is formed with several dented step faces 31 respectively corresponding to several separated insertion members 21 of the seat 2. A post 32 projects from each step face corresponding to the hole 213 of the insertion member 21. The length of the post 32 is at most equal to the length of the hole 213. When the disc 3 is inlaid in the recess 11 of the tire 1 with the posts 32 inserted into the insertion members 21, the free ends of the insertion members 21 just abut against the step faces 31.

The disc is further formed with several axial perforations 33 corresponding to the other several insertion members 21a of the seat 2. Four bolts 4 are respectively passed through the perforations 33 and screwed into the insertion members 21a to associate the disc, seat and tire together.

Figure 3:
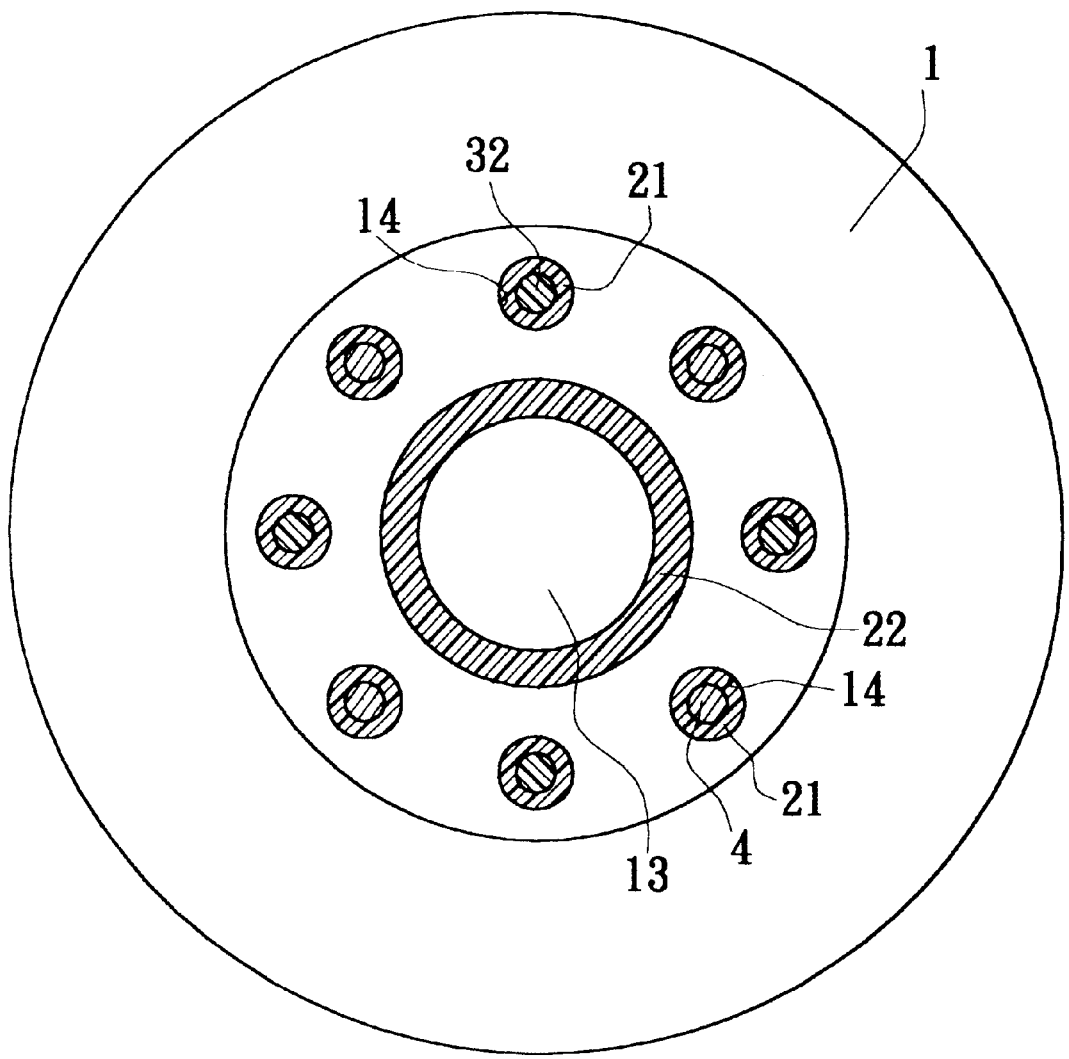
FIG. 3 is a view sectional taken along line 3—3 of FIG. 1.
Figure 4:
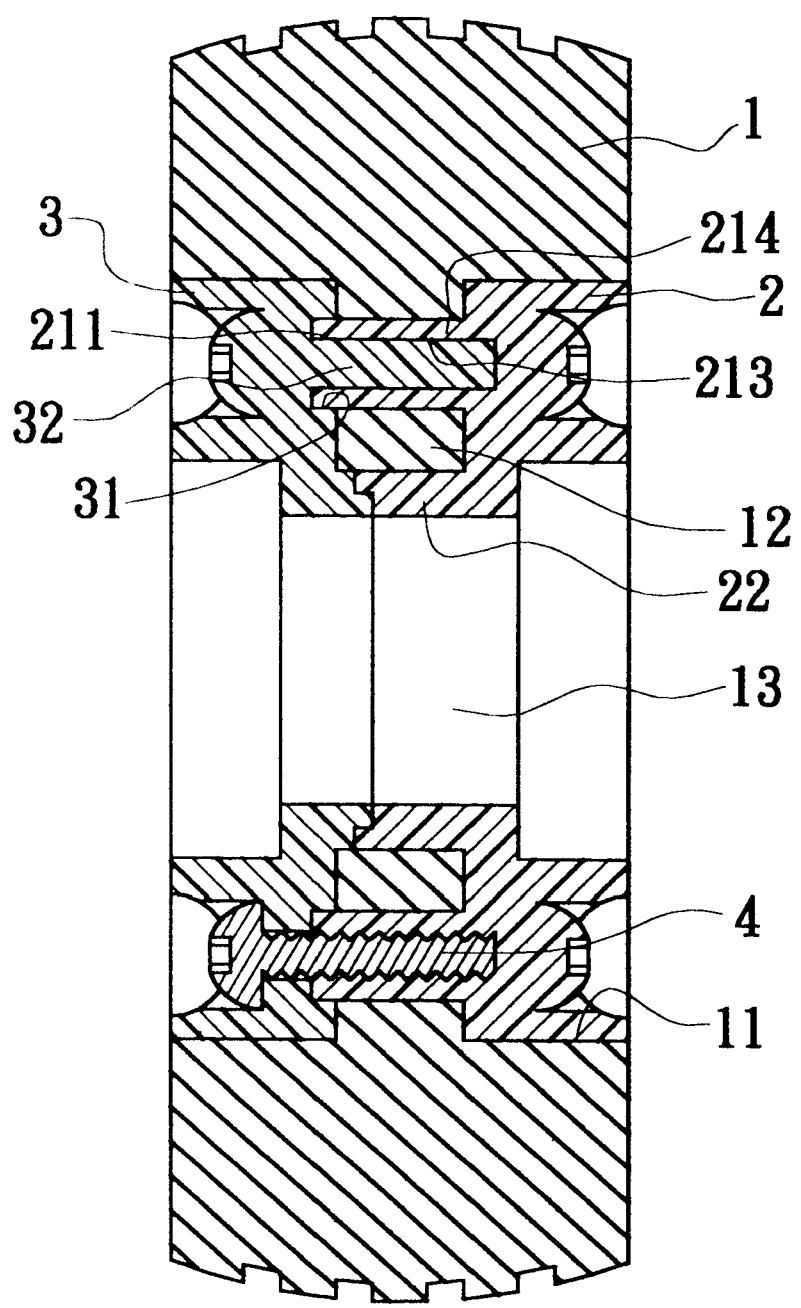
FIG. 4 is a sectional view taken along line 4—4 of FIG. 1.

According to the above arrangement, the present invention has the following advantages:

1. The circumferences of the perforations 14 of the tire 1 are separated from the central through hole 13 of the tire 1 by a certain distance. Therefore, the circumference of the perforation 14 is enclosed and the perforation 14 simply axially passes through the annular section 12 to avoid deformation of the tire, especially with respect to hollow tire 1 easy to deform. Referring to FIGS. 3 and 4, in the case that the tire 1 suffers an axial or radial force, the perforations 14 and the annular section 12 are not easy to deform so that the rim 20 is prevented from detaching out of the tire 1. Moreover, even if the tire 1 is deformed, the insertion members 21 of the seat 2 are fitted through the perforations 14 of the tire 1 to connect with the disc 3 so that the rim is still uneasy to detach out of the tire.

2. For example, the tire 1 and rim 20 of the present invention can be mounted on a baggage case. Referring to FIG. 4, the insertion members 21 of the seat 2 are axially fitted through the perforations 14 of the tire 1 and coupled with the disc 3. Therefore, the tire 1, the seat 2 of the rim 20 and the disc 3 of the rim 20 are effectively drivingly connected. Therefore, when a user drags the baggage case, the tire 1 will roll without slippage.

3. Furthermore, the disc 3 is formed with several dented step faces 31 respectively corresponding to the insertion members 21 of the seat 2. When the insertion members 21 are inserted through the perforations 14 of the tire 1, the free ends of the insertion members 21 just sink into and abut against the step faces 31. By means of cooperation between the step faces 31 and the free ends of the insertion members 21, the seat 2 is more firmly associated with the disc 3. Accordingly, when the seat 2 is rotated, the disc 3 is more effectively driven to rotate.

4. A post 32 projects from each step face 31 of the disc 3 corresponding to the insertion member 21 of the seat 2. When the disc 3 is connected with the seat 2, the projecting posts 32 are first inserted into the insertion members 21 to guide the disc 3 to move. Therefore, the free ends of the insertion members 21 can truly respectively abut against the step faces 31. Accordingly, the assembly can be conveniently performed.

Figure 5:
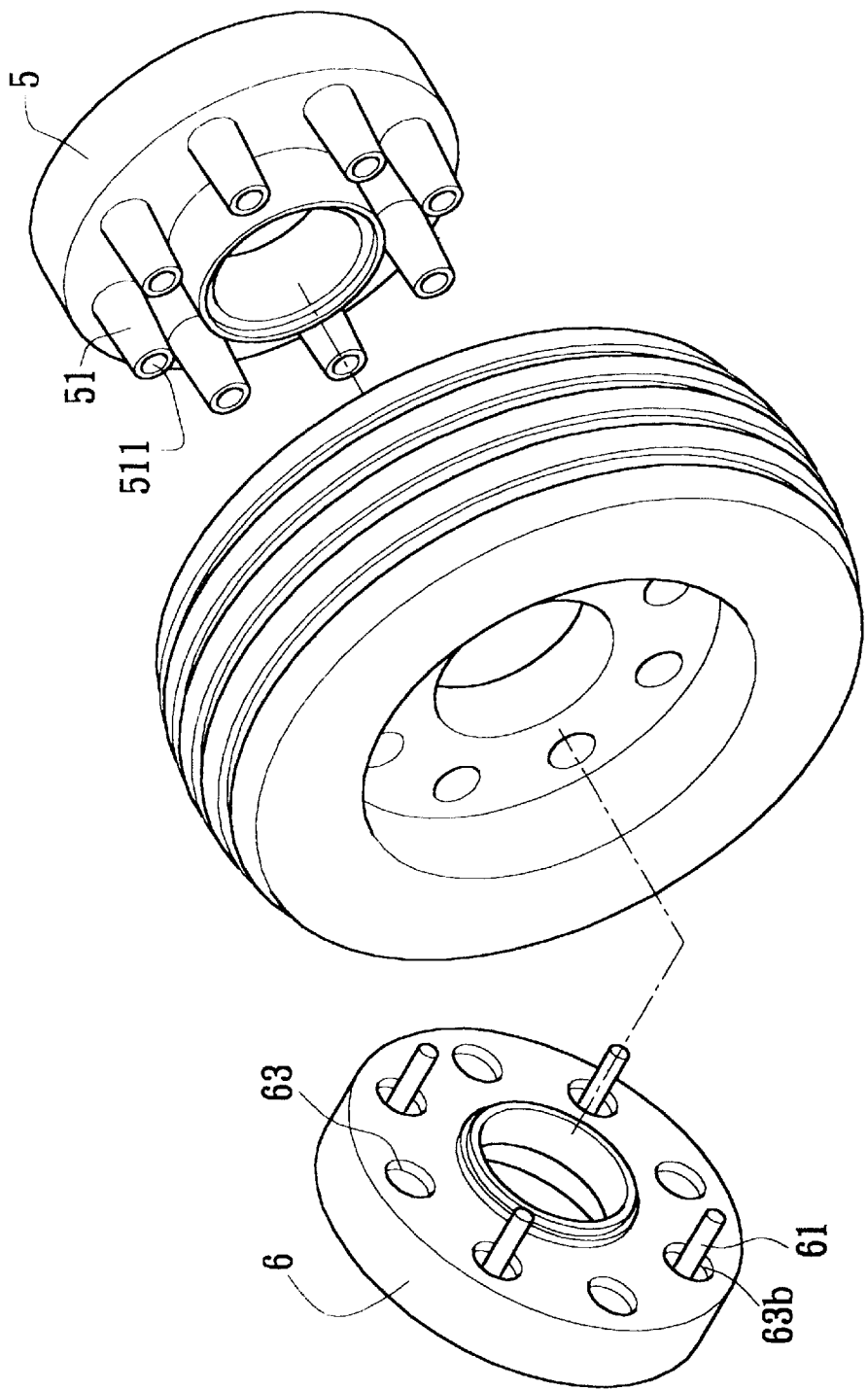
FIG. 5 is a perspective exploded view of a second embodiment of the present invention.
Figure 6:
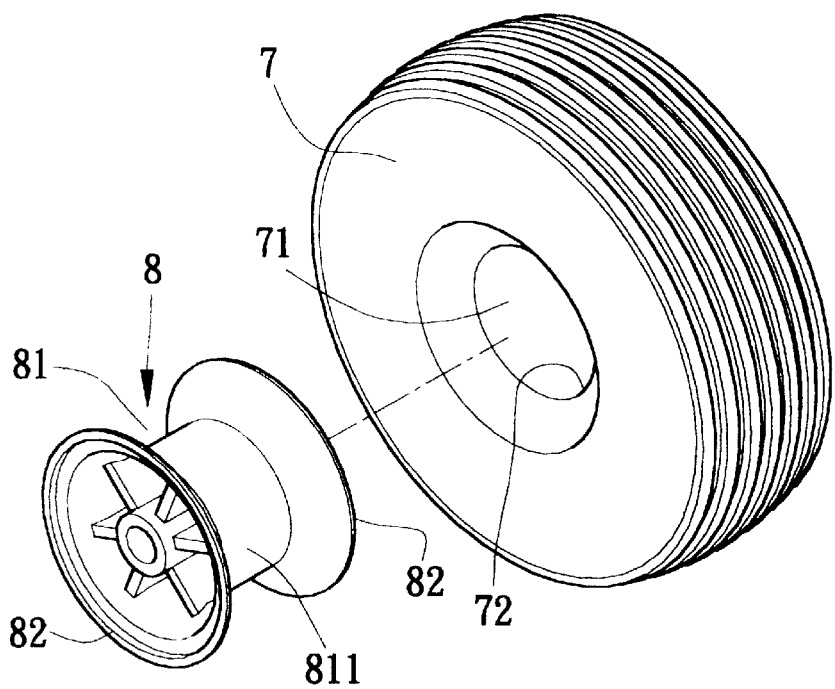
FIG. 6 is a perspective exploded view of a conventional tire and rim.
Figure 7:
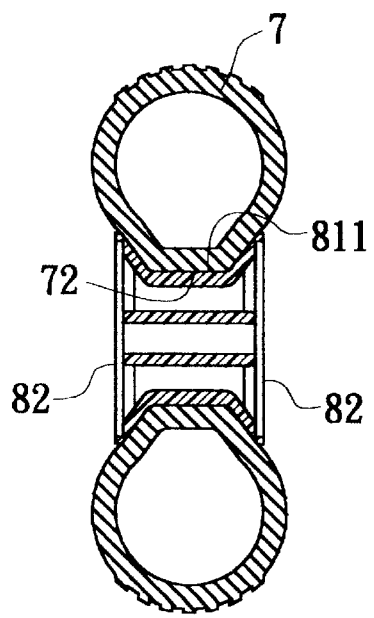
FIG. 7 is a sectional assembled view of the conventional tire and rim of FIG. 6.
Figure 8:
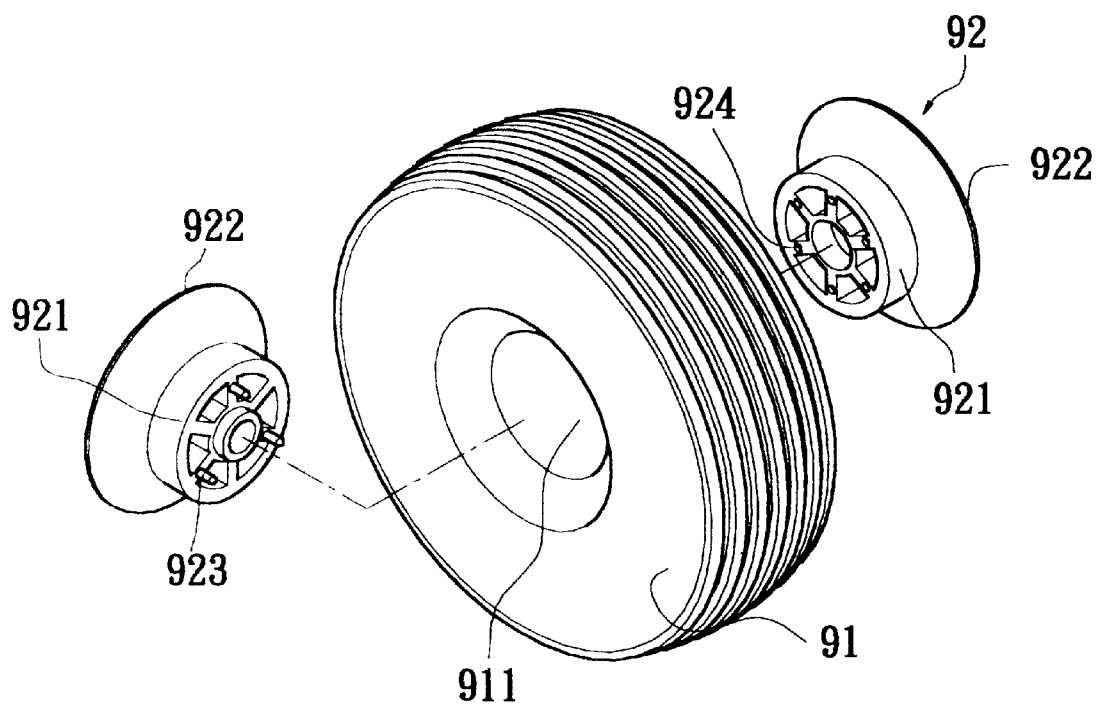
FIG. 8 is a perspective exploded view of another type of conventional tire and rim.

FIG. 5 shows a second embodiment of the present invention, which is different from the first embodiment in that one side of the disc 6 facing the seat 5 is formed with multiple dented step faces 63 respectively corresponding to free ends of the insertion members 51 of the seat 5. A post 61 projects from each of four separated step faces 63b. When the projecting posts 61 of the disc 6 are inserted into the insertion members 51 of the seat 5 from the other side of the tire, the free ends of the insertion members 51 just abut against the step faces 63. Then the seat 5 and the disc 6 are adhered to each other by means of ultrasonic wave so as to fix the rim on the tire.

The above embodiments are only used to illustrate the present invention, not intended to limit the scope thereof. Many modifications of the above embodiments can be made without departing from the spirit of the present invention.

What is claimed is:

1. A structure for connecting a rim with a tire, the tire being formed with a central axial through hole, multiple annularly arranged perforations being formed around the through hole, each perforation being defined by a close circumference, the circumference being separated from the through hole by a separating section therebetween, whereby the circumference of the perforation is enclosed and the perforation simply axially passes through the tire, the rim being composed of a seat and a cooperative disc, the seat having insertion members respectively corresponding to the perforations of the tire, whereby the insertion members are inserted into the perforations from one side of the tire, while the disc is mounted on the other side of the tire to connect with the seat.

2. The structure for connecting a rim with a tire as claimed in claim 1, wherein the insertion members are hollow tubular members each having an axial hole, the disc being formed with several posts respectively corresponding to several equally spaced insertion members of the seat, each post being inserted in one insertion member, the post having a length at most equal to a length of the hole of the insertion member.

3. The structure for connecting a rim with a tire as claimed in claim 2, wherein one side of the disc facing the seat is formed with multiple dented step faces respectively corresponding to free ends of the insertion members, the post projecting from each step face, whereby when the posts are respectively inserted into the insertion members of the seat, the free ends of the insertion members just abut against the step faces.

4. The structure for connecting a rim with a tire as claimed in claim 2, wherein the disc is further formed with several axial perforations corresponding to the other insertion members free from the posts, whereby several bolts are respectively passed through the perforations and screwed into the other insertion members to associate the disc, the seat and the tire together.

5. The structure for connecting a rim with a tire as claimed in claim 1, wherein two sides of the tire are respectively formed with two recesses corresponding to the seat and the disc, whereby the center of the tire is formed with an annular section thinner than the tire, the annularly arranged perforations being formed on the annular section, the seat and the disc being respectively inlaid in the recesses, the seat being formed with an annular wall corresponding to the through hole of the tire for fitting therein.

6. The structure for connecting a rim with a tire as claimed in claim 1, wherein the seat and the disc are adhered to each other by means of ultrasonic wave so as to fix the rim on the tire.

7. The structure for connecting a rim with a tire as claimed in claim 1, wherein the tire is hollow.

\* \* \* \* \*